United States Patent [19]

Laming et al.

[11] Patent Number: 5,282,079
[45] Date of Patent: Jan. 25, 1994

[54] OPTICAL FIBRE AMPLIFIER

[75] Inventors: Richard I. Laming, Hamble, England; Simon B. Poole, Marrickville, Australia

[73] Assignee: Pirelli General plc, London, England

[21] Appl. No.: 908,835

[22] Filed: Jul. 2, 1992

Related U.S. Application Data

[63] Continuation of Ser. No. 668,757, Mar. 14, 1991, abandoned, which is a continuation of Ser. No. 363,072, Jun. 8, 1989, abandoned.

[30] Foreign Application Priority Data

Jun. 10, 1988 [GB] United Kingdom ............... 8813769

[51] Int. Cl.$^5$ ............................. H01S 3/00; G02B 6/10
[52] U.S. Cl. ........................................ 359/341; 372/6; 372/68

[56] References Cited

U.S. PATENT DOCUMENTS

| | | | |
|---|---|---|---|
| 3,953,620 | 4/1976 | Chandross et al. | 427/53 |
| 4,015,217 | 3/1977 | Snitzer | 330/4.3 |
| 4,193,879 | 3/1980 | Leach | 330/4.3 |
| 4,637,025 | 1/1987 | Snitzer et al. | |
| 4,666,247 | 5/1987 | MacChesney et al. | |
| 4,680,046 | 7/1987 | Motoki et al. | 65/17 |
| 4,680,048 | 7/1987 | Matsuo et al. | 65/17 |
| 4,733,133 | 3/1988 | Dandl | 315/111.41 |
| 4,751,429 | 6/1988 | Minich | 315/5 |
| 4,826,288 | 5/1989 | Mansfield et al. | 350/96.29 |
| 4,848,998 | 7/1989 | Snitzer et al. | 65/3.11 |
| 4,938,556 | 7/1990 | Digonnet et al. | 359/341 |

FOREIGN PATENT DOCUMENTS

| | | |
|---|---|---|
| 243010 | 10/1987 | European Pat. Off. |
| 286626 | 10/1988 | European Pat. Off. |
| 294977 | 12/1988 | European Pat. Off. |
| 8607221 | 12/1986 | PCT Int'l Appl. |
| 2199029 | 2/1987 | PCT Int'l Appl. |
| 8802133 | 3/1988 | PCT Int'l Appl. |
| 2180392 | 3/1987 | United Kingdom |

OTHER PUBLICATIONS

Ainslie et al, Mater. Lett., vol. 6, #5-6, pp. 139-144, Mar. 1988; Abst. only provided herewith.
Urquhart, P.; IEE Proceedings, vol. 135, Pt. J. #6, Dec. 1988, pp. 385-407.
Ishii et al, "Preparation of... Fluorescence Properties"; J. Am. Ceram. Soc., vol. 70, #2, pp. 72-77 Feb. 1987.
Townsend et al, "Solution-Doping Technique ... Fibres", Electron. Lett., vol. 23, #7, pp. 329-331; Mar. 26, 1987.
Arai et al., J. Appl. Phys., vol. 59, p. 3430, 1986.
Armitage et al, Digest of Topical Mtg. on tunable Solid State Laser, Optical Soc. of America, Wash., D.C. 1987 Paper WD3.
Barnes et al, "Q-Switched ... Fibre Lasers"; IEE Colloq. an All-Fibre Devices; Jun. 3, 1988.
OFC/IOOC, Optical Fiber Communication Conference and International Integrated Optical Fiber Conference, Reno, Nev., Jan. 19-22, 1987 Technical Digest, paper W14; C. A. Millar et al.
Applied Physics Letters, vol. 51, No. 22, Nov. 30, 1987, pp. 1768-1770, American Institute of Physics, New York, N.Y. US; M. Nakazawa et al.
J. Krall et al., "Modulation of An Intense Beam By An External Microwave Source: Theory and Simulation", *Applied Physics Letters*, vol. 52, No. 6, Feb. 8, 1988, pp. 431-433.
Fabrication of Optical Fibres Containing Low Levels of Rare-Earth Ions S. B. Poole, D. N. Payne—Proc. 11th European Conference on Optical Communications—Month of Publn. Jan. 10, 1985—vol. III Iss: pp. 11-14.

(List continued on next page.)

Primary Examiner—Nelson Moskowitz
Attorney, Agent, or Firm—Brooks Haidt Haffner & Delahunty

[57] ABSTRACT

An Ar$^+$ion laser pumped optical fibre amplifier is provided with an optical fibre having a core which has been solution doped using a solution of an aluminum and an erbium salt.

10 Claims, 2 Drawing Sheets

OTHER PUBLICATIONS

Neodymium-doped silica single-mode fibre lasers—R. J. Mears, L. Reekie, S. B. Poole and D. N. Payne Electron. Letter—Month of Publn. Aug. 1985 vol. 21, Iss: 17 pp. 738-740.

Characterisation of fibres containing rare-earth ions—S. B. Poole, D. N. Payne, M. E. Fermann, R. I. Laming, R. J. Mears JOERS Advanced Fibre Measurements Symposium, National Physical Laboratory—London Jan. 9, 1985.

Single-mode neodymium fibre lasers—R. J. Mears, D. N. Payne, S. B. Poole, L. Reekie, I. P. Alcock, A. I. Ferguson et al.—Presented at National Quantum Electronics Conference—Month of Publn. Jan. 9, 1985.

Tunable single-mode fibre lasers—L. Reekie, R. J. Mears, D. N. Payne, S. B. Poole—Proc. ECOC, Post-deadline paper—Month of Publn. Jan. 10, 1985—vol. III Iss: pp. 85-87.

Rare-earth-doped fibre lasers—R. J. Mears, L. Reekie, S. B. Poole, D. N. Payne—Paper TUL15 at Optical Fibre Communication Conference—Month of Publn. Jan. 1, 1986-vol. Paper TUL15 Iss: pp. 62-64.

Tunable single-mode fibre lasers—L. Reekie, R. J. Mears, S. B. Poole, D. N. Payne—Journal of Lightwave Technology-Month of Publn. Jul. 1986 vol: LT-4 Iss: 7 pp. 956-960.

Development of rare-earth doped fibres and single-mode fibre lasers R. J. Mears, L. Reekie, S. B. Poole, D. N. Payne—Anglo-Chinese Symposium on Optical Communications—Month of Publn. Jan. 5, 1986, pp. 133-137.

Fabrication and characterisation of low-loss optical fibers containing rare-earth ions—S. B. Poole, D. N. Payne, R. J. Mears, M. E. Fermann, R. I. Laming Journal of Lightwave Technology-Month of Publn. Jul. 1986 vol: LT-4 Iss: 7 pp. 870-876.

Low-threshold tunable CW and Q-switched fibre laser operating at 1.55 um R. J. Mears, L. Reekie, S. B. Poole, D. N. Payne—Electronics Letter vol. 22-Iss: 3 pp. 159-160.

Optical bistability at 1.54 um in an Er3+-doped single-mode fibre laser L. Reekie, R. J. Mears, S. B. Poole, D. N. Payne-Proc. ECOC, Barcelona Month of Publn. Sep. 1986—pp. 225-228.

Characterisation of speciality fibres and components (Invited) D. N. Payne, S. B. Poole, M. P. Varnham, R. D. Birch—Technical Digest of Symposium on Optical Fiber Measurements—Month of Publn. Jan. 1, 1986—pp. 107-113.

Line narrowing and spectral hole burning in single-mode ND3+—fibre lasers N. Zurn, J. Voigt, E. Brinkmeyer, R. Ulrich, S. B. Poole—Optics Letters Month of Publn. May 1987—vol. 12, Iss: 5, pp. 316-318.

Rare-Earth Doped Single-Mode Fiber Lasers, Amplifiers and Devices—D. N. Payne, L. Reekie, R. J. Mears, S. B. Poole, I. M. Jauncey, J. T. Lin—Technical Digest, CLEO/IQEC, Month of Publn. Jun. 1986—vol. FN1 pp. 374-375.

A Pr3+-doped single-mode fibre laser—L. Reekie, R. J. Mears, S. B. Poole, D. N. Payne—IOP/IEE Symposium "Advances in Solid State Lasers" Month of Publn. May 1986.

Multi-photon effects in rare-earth doped fibres M. E. Fermann, J. E. Townsend, M. C. Farries, S. B. Poole, D. N. Payne IEE Colloquium 'Optical Fibre Measurements' London—Month of Publn. Jan. 5, 1987—vol. Dig1987/55 Iss:6.

Special Optical Fibres (Invited) S. B. Poole, D. N. Payne "Optical Fibres 87" Conference organised by SIRA, Olympia—month of publn. Jan. 5, 1987 vol. 734—pp. 92-103.

Extended Wavelength Operation of an Er3+-doped Fibre Laser Pumped at 808 nm I. M. Jauncey, L. Reekie, S. B. Poole, D. N. Payne—OFC Paper THD2 Month of Publn. Jan. 1988—vol. Paper THD2—p. 155.

Recent developments in rare-earth doped fibres and fibre lasers S. B. Poole Proceedings of ACOFT—vol. 12, pp. 103-106.

Diode-Laser-Pumped Operation of an Er3+-doped Single-Mode Fibre Laser L. Reekie, I. M. Jauncey, S. B. Poole, D. N. Payne—Electronics Letter Month of Publn. Sep. 24, 1987—vol. 23 Iss: 20 pp. 1076-1078.

Fibre Lasers—D. N. Payne, L. Reekie, R. J. Mears, S. B. Poole, I. M. Jauncey, J. T. Lin DOPS-NYR-Month of Publn. Jan. 1, 1987—pp. 7-10.

Intensity Dependent Polarisation Frequency Splitting in an Er3+-doped Fibre Laser—J. T. Lin, L. Reekie, D. N. Payne, S. B. Poole—Proceedings of Conference on Lasers and Electro-Optics—May 25, 1988—Month of Publn. Apr. 1988 vol. TUM 28.

OPTICAL FIBRE AMPLIFIER

This application is a continuation of application Ser. No. 07/668,757, filed Mar. 14, 1991, now abandoned which is a continuation of application Ser. No. 07/363,072, filed Jun. 8, 1989, now abandoned.

This invention relates to optical fibre amplifiers.

An object of the invention is to provide an efficient optical fibre amplifier for amplifying signals at wavelengths of approximately 1532 nm.

Erbium doped fibres are suitable for such amplifiers when pumped with an Ar+ion laser at 514.5 nm.

To operate as an amplifier, the fibre is pumped with an Ar+ion laser operating at 514.5 nm, so as to invert the erbium ions to a metastable energy level Provided that the pump power is sufficient to invert greater than 50% of the erbium ions a signal beam of wavelength approximately 1532 nm propagated through the same fibre will achieve gain. Ideally all the pump power should be converted into useful signal gain, however excited state absorption (ESA) of the pump light depletes the pump power by absorption of pump photons by ions resident in the metastable level and provides an extra loss mechanism which does not contribute to signal gain, thus significantly reducing the amplifier pumping efficiency. A measure of the amplifier pumping efficiency is the ratio of the excited-state absorption cross-section to ground-state absorption (GSA) cross-section, $\sigma ESA/\sigma GSA$. The smaller this ratio, the more efficient the fibre at a particular pump wavelength.

Silica cores of optical fibres are commonly doped with germania ($GeO_2$) to modify the refractive index of the core material. Fibres with such cores when co-doped with erbium exhibit an unacceptably high ratio of ESA to GSA when pumped at wavelengths around 500 nm. We have found that using alumina ($Al_2O_3$) as the refractive index modifying dopant in a silica core doped with erbium provides a considerably lower ratio of ESA to GSA for the fibre at pump wavelengths around 500 nm.

The use of alumina as the refractive index modifying dopant has the additional advantage that the fabrication of the fibre may be facilitated by solution doping the core with a solution of an aluminium salt and an erbium salt, thus introducing both dopants in the same step.

The invention provides an Ar+ion laser pumped optical fibre amplifier having an optical fibre comprising a core which has been solution doped using a solution of an aluminium salt and an erbium salt.

In order that the invention may be well understood, an embodiment thereof, which is given by way of example only, will now be described with reference to the accompanying drawings, in which:

FIG. 1 diagrammatically illustrates an Ar+ion pumped optical fibre amplifier;

Figure 1:
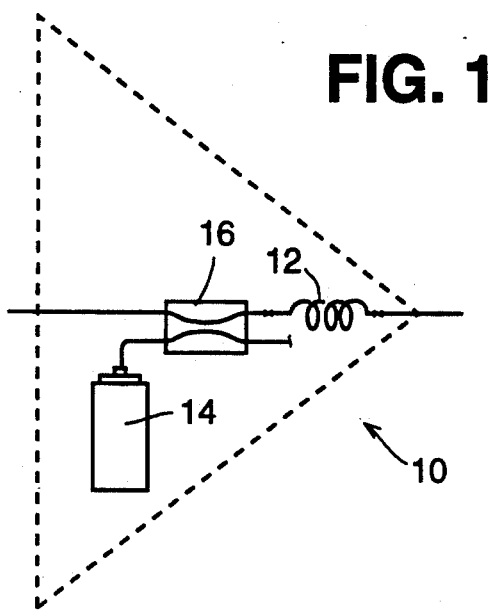

Referring first to FIG. 1, there is shown an optical fibre amplifier 10 (which may be used as a power amplifier, an in-line amplifier or a pre-amplifier) for amplifying signals of approximately 1532 nm. The amplifier 10 comprises an alumina-erbium co-doped fibre 12 arranged to be pumped at 514.5 nm by an Ar+ion laser 14 via a dichroic fibre coupler 16.

The fibre 12 is formed using a solution doping technique as an extension of the well-known MCVD technique. One or more conventional cladding layers (typically a $SiO_2/P_2O_5/F$ glass) are first deposited on the inside surface of the substrate tube in a lathe, following which silica core layers are deposited at a reduced temperature to form a partially-sintered, porous soot. The alumina and erbium dopants are then introduced by removing the thus formed tube from the lathe and soaking the core layers in an aqueous or alcoholic solution of an aluminum salt and an erbium salt to ensure saturation of the porous soot. The tube is then replaced in the lathe, the core layers are dried and fused and the tube collapsed. Fibre drawing from the thus formed preform is conventional An aluminium salt is required which is obtainable in highly pure form and is easily soluble in water or alcohol. Aluminium trichloride hexahydrate is a suitable material, being readily available in 99.9995% pure form and being highly soluble Erbium trichloride hexahydrate is the preferred erbium salt.

Figure 2:
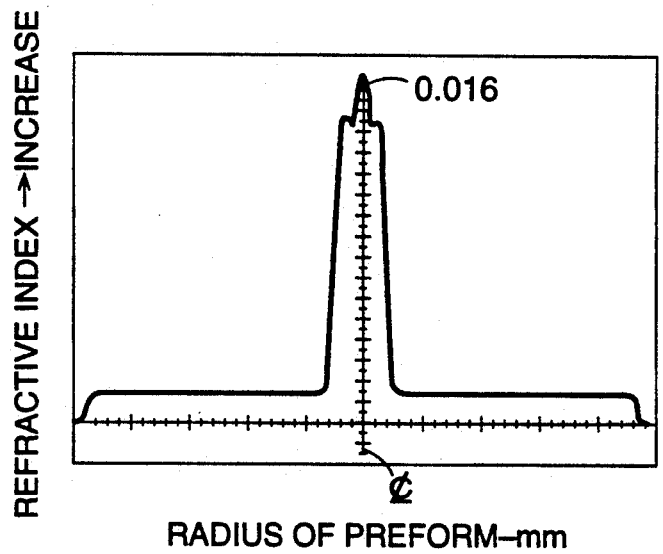
FIG. 2 illustrates the refractive index profile of an a preform alumina doped fibre.

FIG. 2 shows the refractive index profile of a typical preform made using the above technique. The profile is a good approximation to a step profile and indicates the consistency of the incorporation of the alumina across the core.

Figure 3:
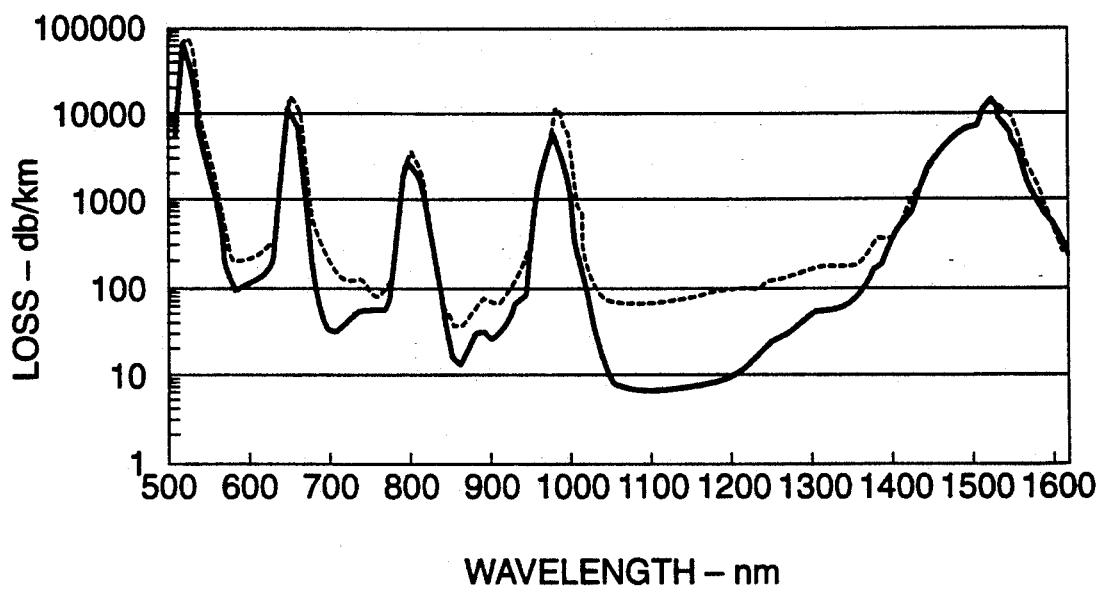
FIG. 3 illustrates the loss spectra of alumina and germania doped fibres co-doped with erbium.
Figure 4:
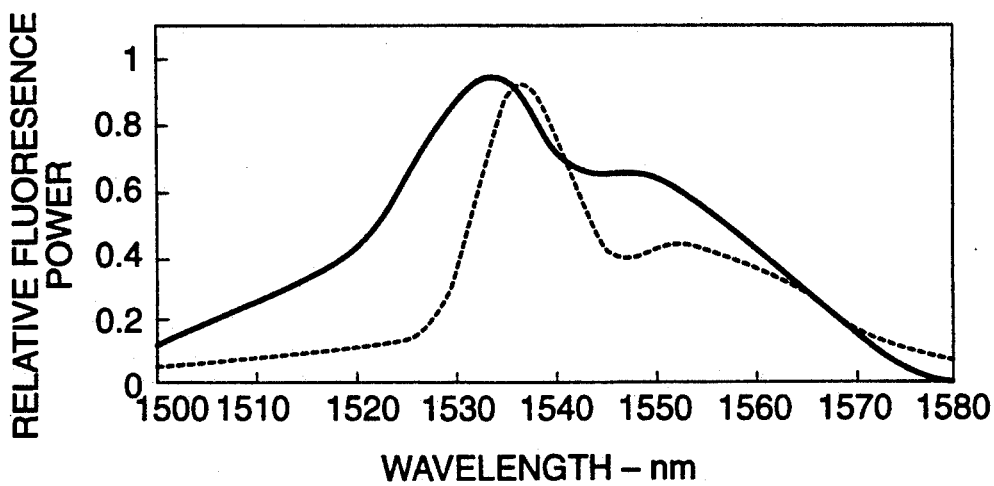
FIG. 4. illustrates the fluorescence spectra of alumina and germania doped fibres co-doped with erbium.

A typical loss spectrum of an $Al_2O_3/SiO_2$ core $Er^{3+}$-doped fibre (125 μm O.D. cut-off=1250 nm) containing about 300 ppm $Er^{3+}$ is shown by the solid line in the graph of FIG. 3 in which graph loss in dB/km is plotted along the Y axis and wavelength in nm is plotted along the X axis. Superimposed on the same graph for comparison in dotted line is the loss spectrum of a $GeO_2/SiO_2$ core $Er^{3+}$ doped fibre containing 200 ppm $Er^{3+}$ which shows the shifts in the relative intensities of the erbium absorption spectra caused by the presence of the alumina. The associated fluorescence spectra are shown in FIG. 4 in which power in arbitrary units is plotted along the Y axis and wavelength in nm is plotted along the X axis with the fluorescence spectra for the alumina doped core being shown in solid line and that for the germania doped core being shown in dotted line. It will be noted that there is very little shift in the peak fluorescence wavelength, compared to the large shift observed in, for instance, the 4-level $^4F_{3/2}-^4I_{11/2}$ transition in $Nd^{3+}$.

As mentioned hereinbefore, it is important for the ratio of excited-state absorption cross-section to ground-state absorption cross-section, ESA/GSA to be small in the fibre of an optical fibre amplifier when pumped. This ratio was measured for the two fibre types at 514.5 nm and found to be approximately 1 and approximately 0.5 for the $Er^{3+}/GeO_2/SiO_2$ and $Er^{3+}/Al_2O_3/SiO_2$ fibres respectively. Thus, the alumina co-doped fibre provides a significantly more efficient amplifier when pumped at 514.5 nm.

Signal gains of 23 dB at 1.536 um have been obtained for an $Er^{3+}/Al_2O_3/SiO_2$ fibre with a numerical aperture of 0.15, pumped with 300 mW of pump light at 514.5 nm. In an $Er^{3+}/GeO_2/SiO_2$ fibre, 300 mW of pump power at 514.5 nm was insufficient to obtain any notable signal gain.

It will be noted from the above that the core need only contain a few hundred ppm $Er^{3+}$ in order to form an effective amplifier.

It is to be understood that other-dopants may be introduced into the erbium alumina co-doped core.

We claim:

1. An optical fiber amplifier for optically amplifying signals at a wavelength of about 1532 nm which has a fiber with an excited-state absorption (ESA) cross-section to ground-state absorption (GSA) cross-section ratio of less than one, said amplifier comprising:

an optical fiber having ends and having a silica based inner-core, a cladding encircling said core, said core being doped with $Er^{3+}$ in an amount at least equal to 200 ppm and with alumina in an amount which will provide a refraction index which is higher than the refraction index of said cladding, said core being free of phosphorous;

a pumping source coupled to an end of said fiber from supplying pumping energy at a wavelength lower than the wavelength of said signals and about 500 nm;

means for supplying said signals connected to an end of said optical fiber for causing ions of said $ER^{3+}$ to fluoresce and provide signal gain; and said amplifier being without means for positive feedback at the wavelength of said signals from one part of said fiber to another part of said fiber whereby signal gain and improved pumping efficiency at said pumping energy wavelength are obtained.

2. An optical fiber amplifier for optically amplifying signals at a wavelength of about 1532 nm which has a fiber with an excited-state absorption cross-section to ground-state absorption cross-section ratio of less than one, said amplifier comprising:

an optical fiber having ends and having a silica based inner-core, a cladding encircling said core, said core being doped with $Er^{3+}$ in an amount at least equal to 200 ppm and co-doped with alumina in an amount which will provide a refraction index which is higher than the refraction index of said cladding, said alumina being the major co-dopant;

a pumping source coupled to an end of said fiber for supplying pumping energy at a wavelength lower than the wavelength of said signals;

means for supplying said signals connected to an end of said optical fiber for causing ions of said $Er^{3+}$ to fluoresce and provide signal gain; and said amplifier being without means for positive feedback at the wavelength of said signals from one part of said fiber to another part of said fiber whereby signal gain and improved pumping efficiency at said pumping energy wavelength are obtained.

3. An amplifier as set forth in claim 1 wherein said $Er^{3+}$ is present in said core in an amount less than 1000 ppm.

4. An amplifier as set forth in claim 1 wherein said $Er^{3+}$ is present in said core in an amount less than amount which will cause upconversion in said optical fiber.

5. An amplifier as set forth in claim 2 wherein said pumping energy wavelength is about 500 nm.

6. An amplifier as set forth in claim 2 wherein said core has been solution doped with a solution of an aluminum salt and an erbium salt.

7. An amplifier as set forth in claim 6 wherein the aluminum salt is aluminum trichloride hexahydrate.

8. An amplifier as set forth in claim 6 wherein the erbium salt is erbium trichloride hexahydrate.

9. An amplifier as set forth in claim 2 wherein said pumping source is an $AR^+$ ion laser.

10. An amplifier as set forth in claim 2 wherein said and $Er^{3+}$ and is present in said core in an amount of about 300 ppm.

* * * * *

UNITED STATES PATENT AND TRADEMARK OFFICE
CERTIFICATE OF CORRECTION

PATENT NO. : 5,282,079
DATED : January 25, 1994
INVENTOR(S) : Laming et al

It is certified that error appears in the above-indentified patent and that said Letters Patent is hereby corrected as shown below:

```
Col. 1, line 16, insert a period (.) after "level"
Col. 1, line 58, cancel "an";
Col. 1, line 59, after "preform" insert --for an--;
Col. 2, line 17, after "conventional" insert a period (.);
Col. 2, line 23, after "soluble" insert a period (.);
Col. 4, line 34, cancel "and" (both occurrences).
```

Signed and Sealed this

Twenty-eighth Day of June, 1994

Attest:

BRUCE LEHMAN

*Attesting Officer*  *Commissioner of Patents and Trademarks*